United States Patent [19]
Solo

[11] 3,895,773
[45] *July 22, 1975

[54] MOLDED WALL FASTENER

[75] Inventor: Alan J. Solo, Brooklyn, N.Y.

[73] Assignee: Knock-N-Lok International, Inc., Brooklyn, N.Y.

[ * ] Notice: The portion of the term of this patent subsequent to July 29, 1992, has been disclaimed.

[22] Filed: Aug. 26, 1974

[21] Appl. No.: 500,537

Related U.S. Application Data

[63] Continuation-in-part of Ser. No. 474,872, May 31, 1974, which is a continuation-in-part of Ser. No. 469,666, May 14, 1974, which is a continuation-in-part of Ser. No. 463,820, April 24, 1974, which is a continuation-in-part of Ser. No. 454,393, March 25, 1974.

[52] U.S. Cl............................ 248/217; 85/5 P; 85/23
[51] Int. Cl.$^2$ .......................................... F16B 15/04
[58] Field of Search ............ 248/217; 85/21, 27, 23, 85/5 N, 5 P

[56] References Cited
UNITED STATES PATENTS

| | | | |
|---|---|---|---|
| 900,318 | 10/1908 | Smith | 85/23 |
| 1,185,587 | 5/1916 | Bragg et al. | 248/217 |
| 1,631,044 | 5/1927 | Lytton | 85/23 |
| 2,396,276 | 3/1946 | Lang | 85/23 |
| 2,793,559 | 5/1957 | Yedinak | 85/23 |
| 2,927,497 | 3/1960 | Rapata | 85/21 X |

Primary Examiner—J. Franklin Foss
Attorney, Agent, or Firm—Friedman & Goodman

[57] ABSTRACT

A wall fastener includes an elongate shank having one end thereof pointed and suitable for being driven into a penetrable wall. A slotted head is provided at the other end of the shank suitable for being hammered to advance the pointed end in the shank through the penetrable material and for being engaged, such as with a screwdriver, to permit turning of the shank about the axis thereof. Two projections are provided extending from substantially diametrically opposite portions of the shank displaced along the axis of the latter and proximate to the pointed end, the projections each being inclined relative to the shank in the direction of the head. The projections are integrally formed with the shank and are flexible to permit the same to be deformed and at least partially wrapped around the axial length of the shank. In this manner, hammering of the fastener into a penetrable wall causes the wall material to flex the projections to positions substantially coextensive with the shank. Engagement of the head and turning of the latter causes the projections to become twisted about the shank and wedged between the latter and the wall material to thereby fix the fastener in place and prevent the same from becoming separated from the wall.

11 Claims, 7 Drawing Figures

PATENTED JUL 22 1975 3,895,773
SHEET 2

MOLDED WALL FASTENER

CROSS REFERENCE TO RELATED APPLICATION

The present application is a continuation-in-part application of U.S. application Ser. No. 474,872 filed May 31, 1974, for WALL FASTENER, the latter application being a continuation-in-part of U.S. application Ser. No. 469,666, filed May 14, 1974, for SUPPORTING FASTENER, the latter application being a continuation-in-part application of U.S. application Ser. No. 463,820, filed Apr. 24, 1974, for LOCKABLE FASTENER, the latter application being a continuation-in-part application of U.S. application Ser. No. 454,393, filed Mar. 25, 1974, for WOOD ANCHORING NAIL.

BACKGROUND OF THE INVENTION

The present invention generally relates to fasteners, and particularly to an integrally formed wall fastener which can be driven into a brittle penetrable material, such as plaster board or the like, and which includes flexible projections inclined relative to a shank of the fastener which become twisted about the shank and wedged between the latter and the wall material when the fastener is turned about its axis subsequent to being driven into the wall material.

Fasteners known in the art are generally described in my previous co-pending applications, of which this application is a continuation-in-part. Generally, prior art anchors which are to be driven into wall materials, such as plaster board, have either been complex in construction and therefore costly to manufacture, inconvenient to use or have failed to be fully effective insofar as the retentive power of the anchor is concerned once the latter penetrates the wall or surface. The present invention is for a unitary wall fastener which is molded from a flexible material, such as nylon, and which is effective in being retained within a plaster board wall. The subject fastener modifies the WALL FASTENER disclosed in the above U.S. application Ser. No. 474,872 in several important respects. The projections extending from the shank, for example, are now inclined relative to the latter in the direction of the head of the fastener. This facilitates penetration of the fasteners into a brittle penetrable material without damage to the projections. Elimination of the serrations on the projections reduces manufacturing costs and reduces the stresses exerted on the projections during the penetration process. The modified fastener is simple in construction and economical to manufacture and becomes fixed within the wall into which it is driven by simply turning the same about its axis. The wall fastener in the present invention has been determined to be extremely effective and cannot withstand very high extracting forces acting upon the fastener after the latter has been driven into a brittle penetrable material and locked in place.

SUMMARY OF THE INVENTION

Accordingly, it is an object of the present invention to provide a wall fastener which does not have the above disadvantages associated with prior art wall fasteners.

It is another object of the present invention to provide a wall fastener which is simple in construction and economical to manufacture.

It is still another object of the present invention to provide a wall fastener of the type under discussion which is particularly suitable for plaster board or gypsum board walls.

It is yet another object of the present invention to provide a wall fastener of the type under consideration which can be securely anchored in brittle penetrable materials.

It is a further object of the present invention to provide a wall fastener as suggested in the above objects which is integrally formed from at least a partially flexible material and which includes arms or projections proximate to a pointed end of a shank of the fastener and inclined in the direction of a head of the latter, the projections becoming twisted about the shank and wedged between the latter and the wall material when the fastener is turned about its axis.

It is still a further object of the present invention to provide a wall fastener which is generally in the form of a nail and which is integrally formed and includes a hook projecting from the head thereof, the hook being suitable for supporting a device once the fastener is driven into the wall material and turned about its axis.

In order to achieve the above objects, as well as others which will become apparent hereafter, the wall fastener of the present invention comprises an elongated shank. Said shank has one end thereof pointed and suitable for being driven into a penetrable wall. An engageable head at the other end of said shank is suitable for being hammered to advance the pointed end and said shank through the penetrable wall and for being engaged to permit turning of said shank about the axis thereof. At least one projection is provided which extends from said shank proximate to the pointed end and is inclined relative to said shank in the direction of said head. Said projection is integrally formed with said shank and is flexible to permit the same to be deformed and at least partially wrapped around the axial length of the shank. In this manner, when the fastener is hammered into a penetrable wall, this causes the wall material to flex the projection to a position substantially coextensive with said shank. Engagement of said head and turning of the latter, causing simultaneous rotation of said shank about the axis thereof, causes said projection to become twisted about said shank and wedged between the latter and the wall material to thereby lock the fastener in place and prevent the same from becoming separated from the wall.

In the presently preferred embodiment, two projections are provided which have uniform cross-sections along the lengths thereof and extend from substantially diametrically opposite portions of said shank, each of said projections being inclined relative to said shank in the direction of said head. Said engageable head is provided with a transverse slot suitable for being engaged by a screwdriver. Also, support means in the form of a hook is spaced from said head in a radial direction with relation to an axis of said shank, whereby said head may be hammered without damaging said hook.

The projections advantageously extend from said opposite portions which are axially displaced along said shank. When the free end of each projection is similarly disposed proximate to said head, one projection is longer than the other.

Said head may have a hexagonal configuration to be receivable within a hexagonal wrench to be turned by the latter.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

DESCRIPTION OF THE PREFERRED EMBODIMENTS

Figure 1:
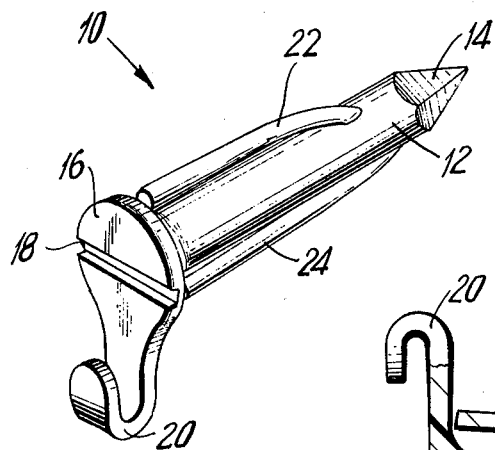
FIG. 1 is a perspective view of a wall fastener in accordance with the present invention.

Referring now to the FIGURES, wherein identical or similar parts are designated by the same reference numerals throughout, and first referring to FIG. 1, a wall fastener in accordance with the present invention is generally designated by the reference numeral 10.

The fastener 10 includes an elongate shank 12 having a point 14 at one end thereof suitable for being driven into a penetrable material. An engageable head 16 is provided at the other end of the shank 12 suitable for being hammered to advance the pointed end 14 and the shank 12 through the penetrable material. In the presently preferred embodiment, the head 16 is engageable by the provision of a transverse slot 18 suitable for being engaged by a screwdriver. However, any other means may be provided for engagement of the head 16 with a suitable tool for the purpose of rotating the shank 12 about its axis subsequent to being driven into the penetrable material. Another embodiment of the head 16 will be described with reference to FIG. 7. In appearance, the wall fastener 10 is in the nature of a nail at the leading end thereof and a screw at the trailing end thereof.

Support means in the form of a hook 20 is integrally formed with the head 16. The hook 20 is suitable for supporting an object after the shank 12 is driven into the wall and the head 16 is turned to bring the position of the hook 20 to that shown in FIG. 1. Advantageously, the hook is spaced from or slightly remote from the head itself in a radial direction with relation to an axis of the shank 12 to thereby prevent the hook from being damaged while the head is hit and the fastener is hammered into the wall.

Figure 2:
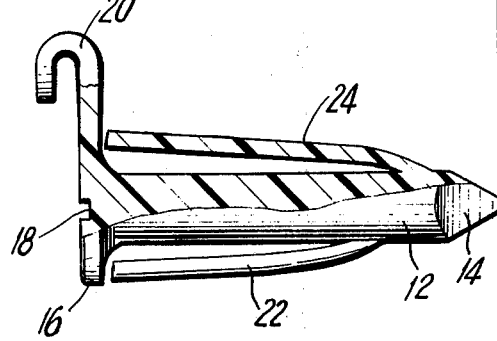
FIG. 2 is a side elevational view of the fastener shown in FIG. 1, partially broken away to show the integral nature of the hook with the head and the projections with the shank, showing the fastener about to be driven into a brittle penetrable material.

An important feature of the present invention is the provision of at least one projection 22 extending from shank 12 proximate the pointed end 14 of the fastener and inclined relative to the shank 12 in the direction of the head 16. In the presently preferred embodiment shown in FIG. 1, two inclined projections 22, 24 are provided extending from substantially diametrically opposite portions of the shank 12. The projection 22 extends from a portion of the shank 12 axially closer to the head 16 and further from the pointed end 14, while the projection 24 extends from a portion of the shank axially further from the head and closer to the pointed end 14. Accordingly, each of the projections 22, 24 extends from shank portions which are axially displaced along the shank. The projections 22, 24 are integrally formed with the shank 12, as shown in FIGS. 1 and 2. As best shown in FIG. 2, the free ends of the projections 22, 24 are similarly disposed proximate to the head 16. Accordingly, the projection 22 is shorter than the projection 24. Such construction has resulted in improved performance and has facilitated penetration of the fastener into a wall surface.

The fastener 10 may be molded from any plastic material. The fastener may be made, for example, from nylon. As will become evident from the description that follows, the material used for forming the fastener 10 must be sufficiently rigid or strong to prevent being damaged while being driven into a penetrable material while being sufficiently flexible and resilient to permit bending of the projections 22, 24. As clearly shown in FIG. 2, the entire fastener 10 is formed integrally, including the integral connection between the hook 20 and the head 16, as well as the integral connection between the projections 22, 24 and the shank 12. The projections 22, 24 are made flexible both by selection of the material from which the fastener is made as well as by selection of the dimensions thereof.

In the embodiment being described, the projections 22, 24 have uniform cross-sections along their lengths. However, the projections 22, 24 may be serrated as disclosed in U.S. application Ser. No. 474,872.

Referring to FIGS. 2–6, successive steps are shown of the manner in which the fastener 10 is driven into and fixed on a wall. In FIG. 2, a plaster board or gypsum wall board 26 is shown to include a plaster, gypsum or other brittle material section 28, and a front paper covering layer 30. The fastener 10 is positioned with its point 14 proximate to the paper covering layer 30 with the hook 20 in an upside down condition disposed above the head 16. It should be noted that the projections 22, 24 are disposed of in a plane which is substantially normal to the direction of the slot 18. The hook 20, on the other hand, is substantially aligned with and parallel to the projections 22, 24.

Figure 3:
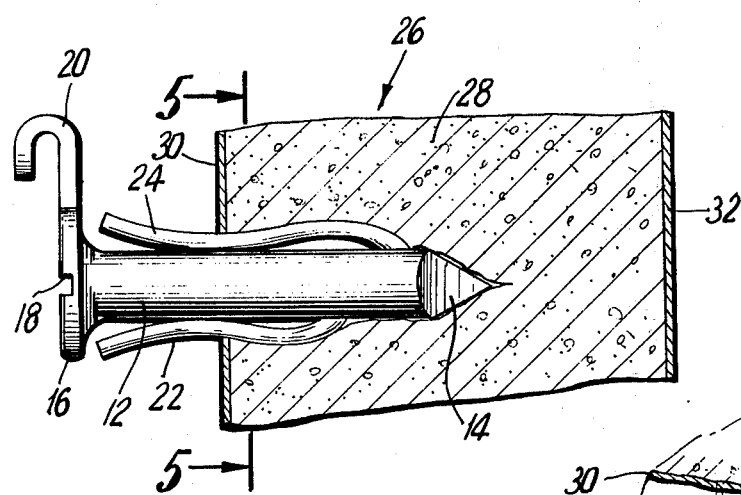
FIG. 3 is similar to FIG. 2, shown after the fastener is partially driven into the material.

In FIG. 3, the fastener is shown partially driven into the plaster board wall 26. As shown in this FIGURE, hammering of the fastener 10 into the penetrable wall 26 causes the wall material 28 to first flex or bend the advancing projections 24 and next the projection 22 to positions substantially coextensive with the shank 12. Advantageously, the projections 22, 24 extend from the shank 12 at points proximate to the pointed end 14. The length of the projections 22 are made approximately equal to the overall length of the shank 12. In this manner, the free ends of the projections 22, 24 become disposed proximate to the head 16 when the projections are flexed subsequent to full entry of the shank 12 into a wall prior to turning of the latter, as suggested in FIG. 3.

Figure 4:
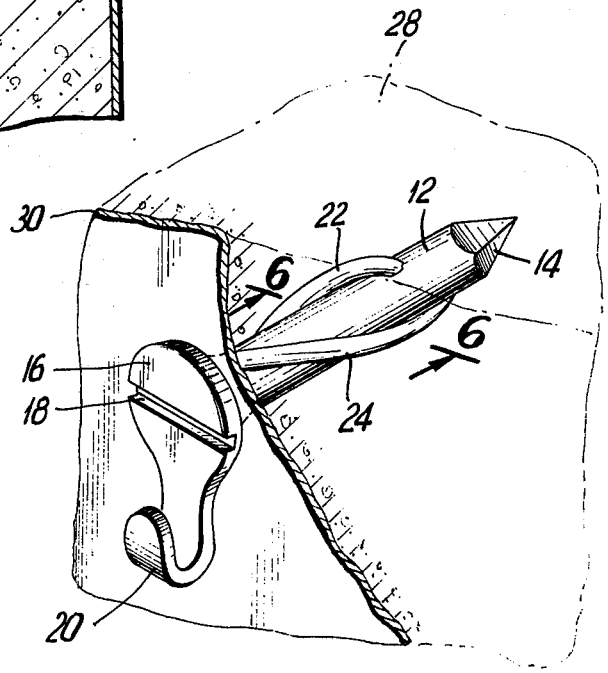
FIG. 4 is a perspective view, partially broken away, showing the fastener fully driven into the material and turned 180° to twist the projections about the shank as shown.

The length of the shank 12 may be selected to correspond to the thickness of the plaster board 26, to substantially extend between the front and rear paper covering layers 30 and 32 respectively, once the fastener is fully driven into the wall, as shown in FIG. 4. However, it is not necessary that the pointed end 14 extend to the rear paper covering layer 32, so long as the projections 22, 24 are substantially contained within the plaster board 26. It is the inter-action between the shank 12, the projections 22, 24 and the plaster or gypsum 28 which results in the high aetention characteristic of the subject fastener.

Figure 5:
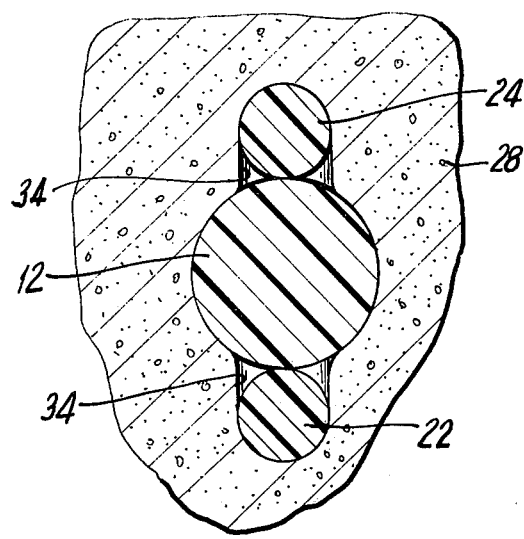
FIG. 5 is a cross section taken in FIG. 3, along line 5—5.

Referring to FIG. 5, it will be noted that the projections 22, 24 generate grooves or elongate channels 34 as the shank is driven into the wall material 28. In most instances, a hole need not be pre-drilled in the plaster board 26, it being sufficient that the fastener be hammered in as suggested in FIGS. 2 and 3. When the fastener 10 is driven into a wall, the plaster or gypsum material 28 through which it is so driven is shattered and at least partially weakened in the regions around the shank 12. For shanks having one-eighth inch diameter and smaller, a hole need generally not be pre-drilled in the wall material. However, it has been found that improved results are obtained in the use of fasteners having shank diameters greater than one-eighth of an inch when a hole is pre-drilled having a diameter corresponding to that of the fastener shank 12. The pre-drilling of a hole in this manner maintains the integrity of the plaster material in the region where the fastener is driven in. This results in improved holding power of the fastener 10.

Once the nail is fully driven into the plaster material, with the hook 20 still in the initial upper position as shown in FIGS. 2 and 3, the head 16 of the fastener is engaged, here by inserting a screwdriver point into the slot 18, and the head is turned 180° to bring the hook 20 to the lower, position shown in FIG. 4. The hook is now in position to support an object such as a picture frame. Clearly, the amount of rotation which is necessary is also a function of the initial position of the hook 20.

Figure 6:
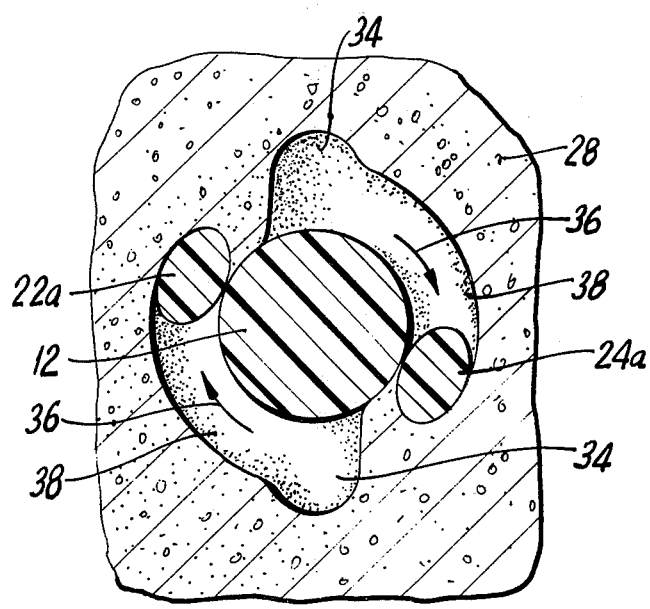
FIG. 6 is a cross section taken in FIG. 4 along line 6—6.

Turning the head 16 and the hook 20 as described also causes simultaneous turning of the shank about the axis thereof. Since the projections 22, 24 are integral with the shank 12, these flex and become twisted about the shank and the resiliency of the projections cause the latter to tend to flare radially outwardly from the axis of the shank as shown in FIGS. 3 and 4, and become wedged between the latter and the wall material 28. This is illustrated in FIG. 6 wherein the transverse projections 22 of FIG. 5 are shown to be wedged between the shank 12 and the plaster or gypsum material 28. Accordingly, the projections 22a are shown to be slightly deformed as the shank is turned in a clockwise direction, indicated by the arrows 36 to generate a space 38 whose radial dimension is slightly smaller than that of the groove or elongated channel 34. For this reason, the projections 22a are in a state of compression, this improving the wedging action and the retaining power of the fastener 10.

Plaster or gypsum material 28 can be very abrasive and shear or otherwise damage the projections 22, 24 when the same are first driven into the wall material. Shearing of the projections is particularly acute when the connected portions of tapered projections are reduced in cross sectional dimensions to enhance their flexibility, as disclosed in U.S. application Ser. No. 474,872. It has been found that inclining the projections 22, 24 and axially displacing the same along the shank 12 substantially reduces the possible damage which may result to the projections.

Figure 7:
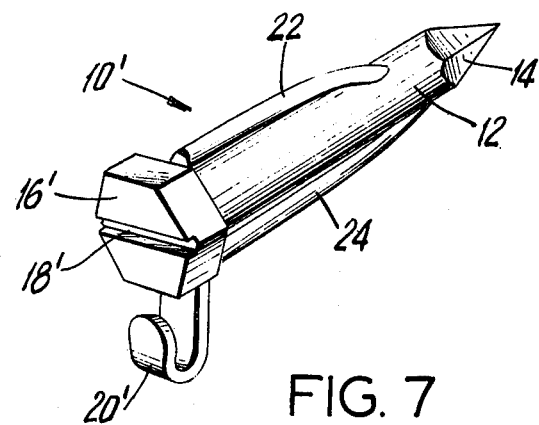
FIG. 7 is a perspective view of another embodiment of the fastener of the present invention.

In FIG. 7, a modified fastener 10' includes a hexagonal head 16' having a slot 18'. A hook 20' depends from the head 16' for purposes described above. By having a hexagonal configuration, the head 16' may be received within a hexagonal wrench and turned by the latter. The hook 20' is similar to hook 20, except that it must extend from the head 16' at a point closer or more proximate to the shank. By being more inwardly spaced as shown, the hook 20' does not interfere with the major portion of the head 16 from being received within a hexagonal wrench.

It has been determined in experiments that wall fasteners of the type above described are extremely effective when used in conjunction with brittle penetrable materials such as plaster board or gypsum wall board. As suggested above, this effectiveness is frequently achieved without the need to first pre-drill holes for the shank 12. The wall fastener of the present invention is extremely advantageous due to its simple, single molded construction and economy of manufacture. In the use of the wall fastener 10, it is merely necessary to drive the same through a wall as with a nail and subsequently turn the fastener approximately 180°, or any other suitable angular rotation, to twist the projections 22, 24 about the shank 12 in wedged condition between the latter and the wall material. Accordingly, the use of these fasteners is extremely simple. This reduces the time and the cost in the use of these fasteners.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A wall fastener for use in relatively brittle penetrable walls comprising an elongate shank, said shank having one end thereof pointed and suitable for being driven into a penetrable wall; an engageable head at the other end of said shank suitable for being hammered to advance the pointed end of said shank through the penetrable wall and for being engaged to permit turning of said shank about the axis thereof; at least one projection extending from said shank proximate to the pointed end and inclined relative to said shank in the direction of said head, said projection being integrally formed with said shank and being flexible and resilient to permit the same to be deformed and at least partially wrapped about the axial length of said shank, whereby hammering the fastener into a penetrable wall causes the wall material to flex said projection to a position substantially coextensive with said shank, and engagement of said head and turning of the latter to thereby cause simultaneous rotation of said shank about the axis thereof, causes said projection to flex and become twisted about said shank, the resiliency of said projections causing the same to tend to flare radially outwardly from the axis of said shank to become wedged between the latter and the wall material to thereby secure the fastener in place and resist the same from becoming removed from the wall.

2. A wall fastener as defined in claim 1, wherein said engageable head is provided with a transverse slot suitable for being engaged by a screwdriver.

3. A wall fastener as defined in claim 1, further comprising support means integrally formed with said head, said support means being positionable to support an object after said shank is driven into the wall and said head is turned to twist said projection about said shank.

4. A wall fastener, as defined in claim 3, wherein said support means includes a hook spaced from said head in a radial direction with relation to an axis of said shank, whereby said head may be hammered without damaging said hook.

5. A wall fastener, as defined in claim 1, wherein two projections are provided extending from substantially diametrically opposite portions of said shank, each of said projections being inclined relative to said shank in the direction of said head.

6. A wall fastener as defined in claim 5, wherein said projections extend from portions which are axially displaced along said shank.

7. A wall fastener as defined in claim 6, wherein the free ends of each of said projections are similarly disposed proximate to said head, whereby one projection is longer than the other.

8. A wall fastener as defined in claim 1, wherein said projection extends from said portions shank a predetermined distance from said head, the length of said projection being approximately equal to said predetermined distance, whereby the free end of said projection is disposed proximate to said head when said projection is flexed during entry into a wall prior to turning of said shank.

9. A wall fastener as defined in claim 1, wherein said projection has a uniform cross-section along its length.

10. A wall fastener as defined in claim 1, wherein said head has a hexagonal configuration, whereby said head may be received within a hexagonal wrench and turned up by the latter.

11. A wall fastener as defined in claim 10, further comprising a hook extending from said head at a portion thereof proximate to said shank, said hook being spaced along the direction of the axis of said shank inwardly from the free end of said head to permit the major portion of the latter to be freely received within a hexagonal wrench without interference from said hook.

* * * * *

UNITED STATES PATENT OFFICE
CERTIFICATE OF CORRECTION

Patent No. 3,895,773              Dated July 22, 1975

Inventor(s) Alan J. Solo

It is certified that error appears in the above-identified patent and that said Letters Patent are hereby corrected as shown below:

Column 1, line 55, "cannot" should read -- can --.

Column 5, line 8, "aetention" should read -- retention --.

Signed and Sealed this eleventh Day of May 1976

[SEAL]

Attest:

RUTH C. MASON
*Attesting Officer*

C. MARSHALL DANN
*Commissioner of Patents and Trademarks*